(12) United States Patent
Tomita

(10) Patent No.: US 7,738,198 B2
(45) Date of Patent: Jun. 15, 2010

(54) IMAGING DEVICE, LENS DRIVE CONTROL METHOD AND RECORDING MEDIUM

(75) Inventor: Shigeaki Tomita, Sagamihara (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 103 days.

(21) Appl. No.: 11/489,976

(22) Filed: Jul. 20, 2006

(65) Prior Publication Data

US 2007/0019308 A1    Jan. 25, 2007

(30) Foreign Application Priority Data

Jul. 22, 2005  (JP) ............................. 2005-213330
Nov. 4, 2005   (JP) ............................. 2005-321005

(51) Int. Cl.
    *G02B 7/02*   (2006.01)
(52) U.S. Cl. ..................... 359/824; 359/819; 359/822; 359/823
(58) Field of Classification Search ................. 359/676, 359/694, 811, 813, 819, 822–824
    See application file for complete search history.

(56) References Cited

U.S. PATENT DOCUMENTS 6,940,542 B2 *  9/2005  Kitazawa et al. ....... 348/208.99
2005/0146633 A1 * 7/2005  Kuo et al. .................. 348/345
2007/0149260 A1 * 6/2007  Satoh et al. ............... 455/575.1

FOREIGN PATENT DOCUMENTS

| JP | 04-278906   | 10/1992 |
| JP | 08-179416   | 7/1996  |
| JP | 10-187245   | 7/1998  |
| JP | 10-209516   | 8/1998  |
| JP | 11-289780   | 10/1999 |
| JP | 11-291951   | 10/1999 |
| JP | 2000-208825 | 7/2000  |
| JP | 2000-258835 | 9/2000  |
| JP | 2001-195856 | 7/2001  |
| JP | 2004-222037 | 8/2004  |
| JP | 2004-294759 | 10/2004 |
| JP | 2004-354531 | 12/2004 |
| JP | 2005-055714 | 3/2005  |
| JP | 2005-159559 | 6/2005  |
| JP | 2005-242716 | 9/2005  |

* cited by examiner

*Primary Examiner*—Jessica T Stultz
*Assistant Examiner*—Mahidere S Sahle
(74) *Attorney, Agent, or Firm*—Cohen Pontani Lieberman & Pavane LLP

(57) ABSTRACT

A controller controls a drive waveform generator to apply a predetermined voltage to a piezoelectric element and deform the piezoelectric element, thereby moving a lens. The controller acquires the position of the lens based on a magnetic field intensity detected by a Hall device. A shock detection circuit measures a voltage generated by deformation of the piezoelectric element caused by an external shock. The controller determines whether or not the voltage measured by the shock detection circuit is larger than a predetermined threshold, and detects positional misalignment of the lens. When detecting the positional misalignment, the controller resets the lens at a position acquired before the shock was applied.

12 Claims, 13 Drawing Sheets

FIG.1A
FIG.1B
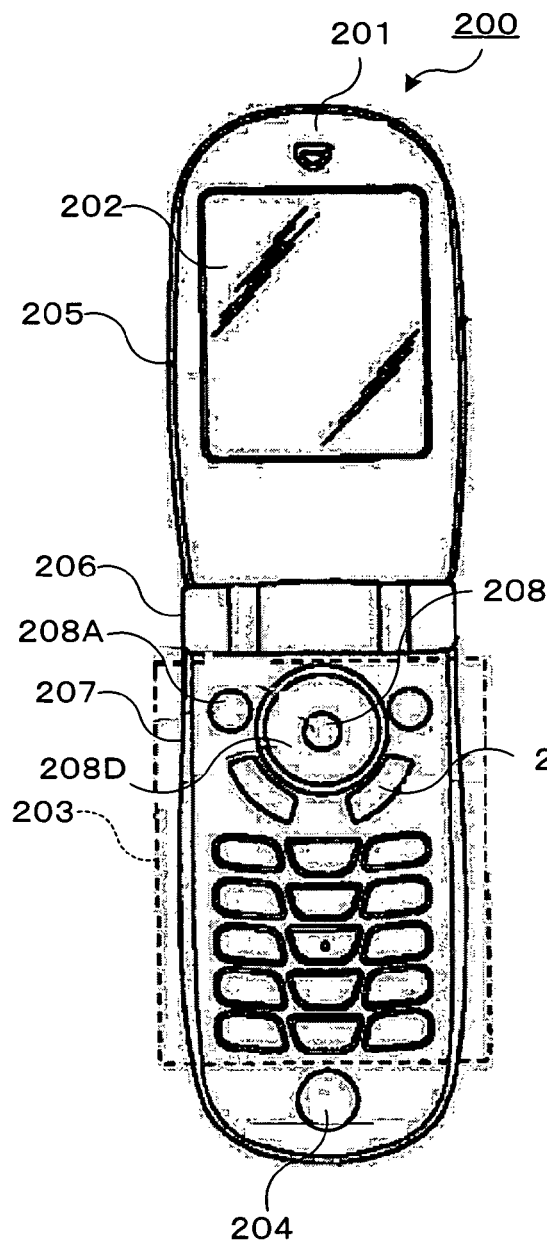
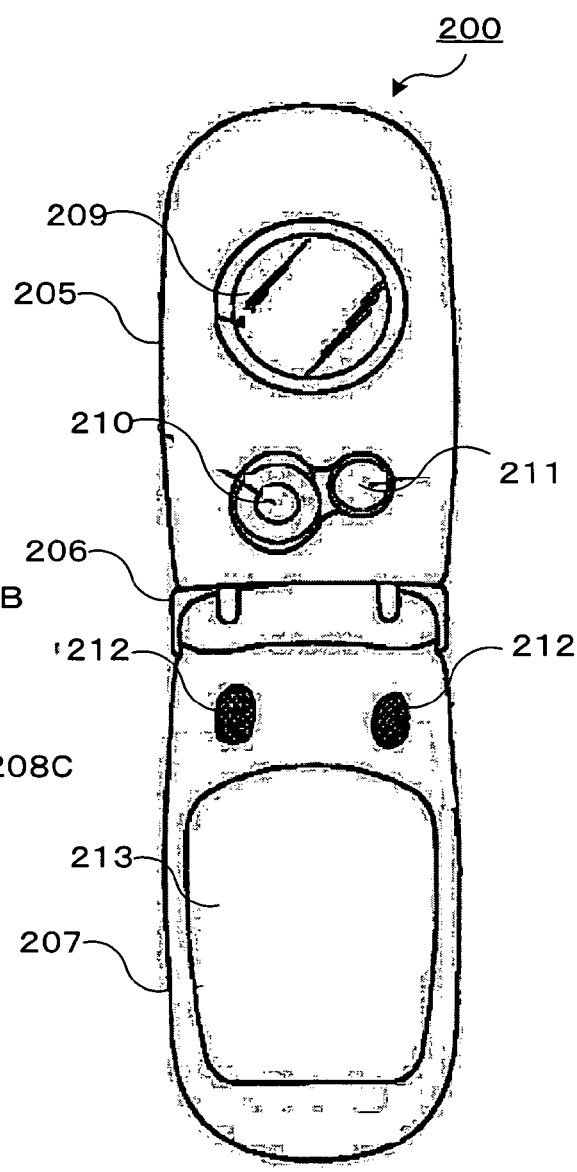

IMAGING DEVICE, LENS DRIVE CONTROL METHOD AND RECORDING MEDIUM

BACKGROUND OF THE INVENTION

1. Field of the Invention

The present invention relates to an imaging device, a lens drive control method and a recording medium.

2. Description of the Related Art

Conventionally, user's manipulation of an external lever or the like changes over the image magnification powers and focal distances of a camera-mounted cellular phone and a camera unit for which miniaturization and flattening are demanded. There is a camera unit which has a downsized step motor and an AF (Auto Focus) function of moving an imaging lens by the step motor.

The use of a step motor limits the miniaturization of a camera unit. In place of this type of camera unit, recent camera units have a piezoelectric element (piezo element) which is used to move a lens. Using the piezoelectric element makes it possible to further lighten and miniaturize the camera units. Piezoelectric elements have a deformation characteristic in accordance with an applied voltage. A camera unit with the piezoelectric element having such a characteristic applies an appropriate voltage to the piezoelectric element to deform the element, thus driving an imaging lens. A device which drives a lens by a piezoelectric element is disclosed in, for example, Unexamined Japanese Patent Application KOKAI Publication No. 2004-294759.

The vibration of a vibration type actuator using the piezoelectric element becomes driving force to move the lens. Because the lens is movable in a vibration direction, if an external shock or the like is applied to the lens and a lens drive device after the lens is moved to a right position, the lens is moved to a wrong position. Shooting in this state raises problems such that a zoom magnification differs from one desired by a user and a focus is missed. Such problems may be overcome by providing some mechanism for fixing a lens at the correct position, which would enlarge the lens drive device and complicate control of lock/release of the lens.

Those problems are not limited to a camera-mounted cellular phone, and also arise in an optical system using the vibration type actuator.

SUMMARY OF THE INVENTION

The present invention has been made in view of the foregoing circumstance, and it is an object of the invention to influence of an external shock or the like hard to be influenced at the time of an image pick-up.

To achieve the object, an imaging device according to the first aspect of the invention comprises a lens, an image unit which images an object through the lens, an adjust unit which has a piezoelectric element, deforms the piezoelectric element with a voltage applied thereto, and adjusts a distance between the lens and the image unit, a first detector which detects an electric signal generated by deformation of the piezoelectric element after adjustment by the adjust unit, and a controller which controls the adjust unit in such a way that the distance between the lens and the image unit is adjusted when the electric signal is detected by the first detector.

A lens drive control method according to the second aspect of the invention is a lens drive control method to be executed by an imaging device having a lens, an image unit, an adjust unit, a detector, and a controller, and comprises an adjustment step that the adjust unit deforms a piezoelectric element located between the lens and the image unit by applying a voltage to the piezoelectric element, a detection step that the detector detects a electric signal generated by deformation of the piezoelectric element after adjustment by the adjust unit, and a control step that the controller controls the adjust unit in such a way that a distance between the lens and the image unit is adjusted when the electric signal is detected in the detection step.

A computer-readable recording medium according to the third aspect of the invention stores a program that allows a computer having a lens and an image unit to execute an adjustment step of deforming a piezoelectric element located between said lens and said image unit by applying a voltage to said piezoelectric element, and adjusting a distance between said lens and said image unit;

a detection step of detecting an electric signal generated by deformation of said piezoelectric element after adjustment in said adjustment step; and a control step of controlling said adjustment step in such a way that said distance between said lens and said image unit is adjusted when said detection step detects said electric signal.

According to the invention, a voltage generated when an external shock is applied to the piezoelectric element is detected, and when it is determined that the detected voltage is larger than or equal to a value, it is possible to set the lens at the original position again. This suppresses shifting of a zoom magnification and focus caused by positional misalignment of the lens. By using the same piezoelectric element for lens driving and for external shock detection, it is possible to save a space.

BRIEF DESCRIPTION OF THE DRAWINGS

These objects and other objects and advantages of the present invention will become more apparent upon reading of the following detailed description and the accompanying drawings in which:

FIGS. 1A and 1B are external views illustrating an example of the structure of a cellular phone according to a first embodiment of the invention;

FIG. 2A illustrates the configuration viewing the camera unit from the front, and FIG. 2B illustrates the configuration viewing the camera unit from the side, and clearly indicating the elongation or shortening direction of a piezoelectric element;

FIG. 3A is an overall condition diagram illustrating the piezoelectric element elongated, and FIG. 3B is an overall condition diagram illustrating the piezoelectric element shrunk;

FIG. 5A illustrates a voltage waveform which is supplied to a first inverter circuit, FIG. 5B is a voltage waveform which is supplied to a second inverter circuit, FIG. 5C is a diagram exemplifying the time change of a voltage applied to the piezoelectric element, and FIG. 5D is a diagram exemplifying the displacement of the position of the piezoelectric element with the time;

DETAILED DESCRIPTION OF THE PREFERRED EMBODIMENTS

First Embodiment

Figure 2A:
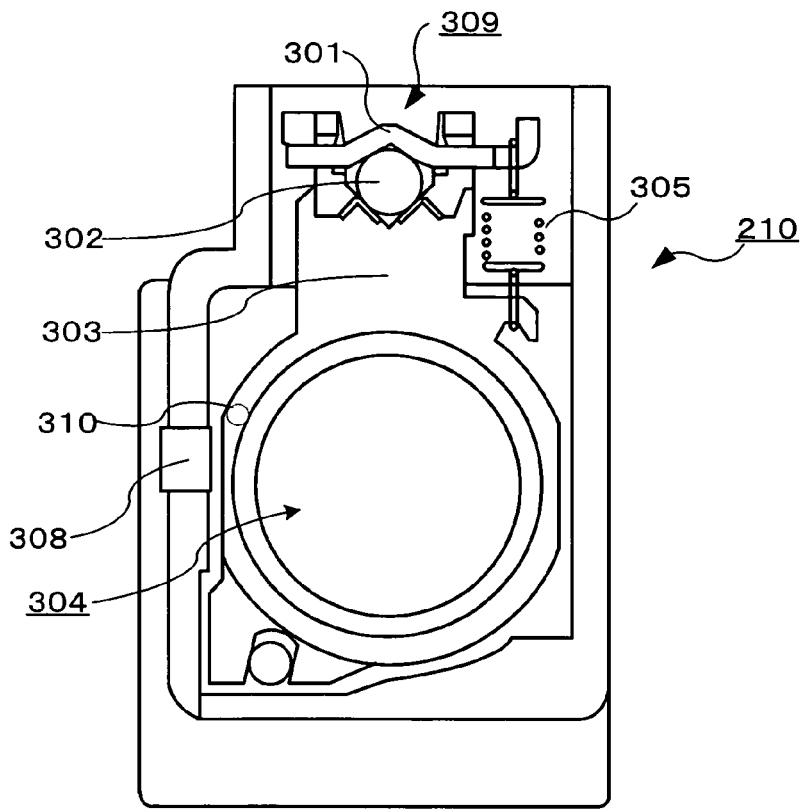
FIGS. 2A and 2B are diagrams illustrating the configuration of a camera unit of the cellular phone according to the first embodiment of the invention.

Best modes for carrying out the invention will be explained in detail.

FIGS. 1A and 1B are external views illustrating a camera-mounted cellular phone 200 having a lens control device according to the first embodiment of the invention. FIG. 1A illustrates the front external appearance of the cellular phone 200 with a lid 205 thereof opened, and FIG. 1B illustrates the rear external appearance with the lid 205 opened.

As illustrated in the figures, the cellular phone 200 is structured in such a way that a hinge unit 206 couples the lid 205 and a main body 207, and is foldable.

Like general cellular phones, the cellular phone 200 has a speaker 201 for communication, a main display unit 202, a key input unit 203, a microphone 204 for communication, a sub display unit 209, a camera unit 210, a stroboscope LED (Light Emitting Diode) 211, a stereo speaker 212, a rechargeable battery 213, and the like.

The key input unit 203 has, for example, a camera key 208A for activating a camera, a set key 208B for shutter operation, an auto focus lock key 208C for keeping a state where an object is focused by auto focusing, a cursor key 208D for adjusting a zoom magnification. A user can gives an instruction to the cellular phone 200 on desired operation by manipulating those keys.

Figure 2B:
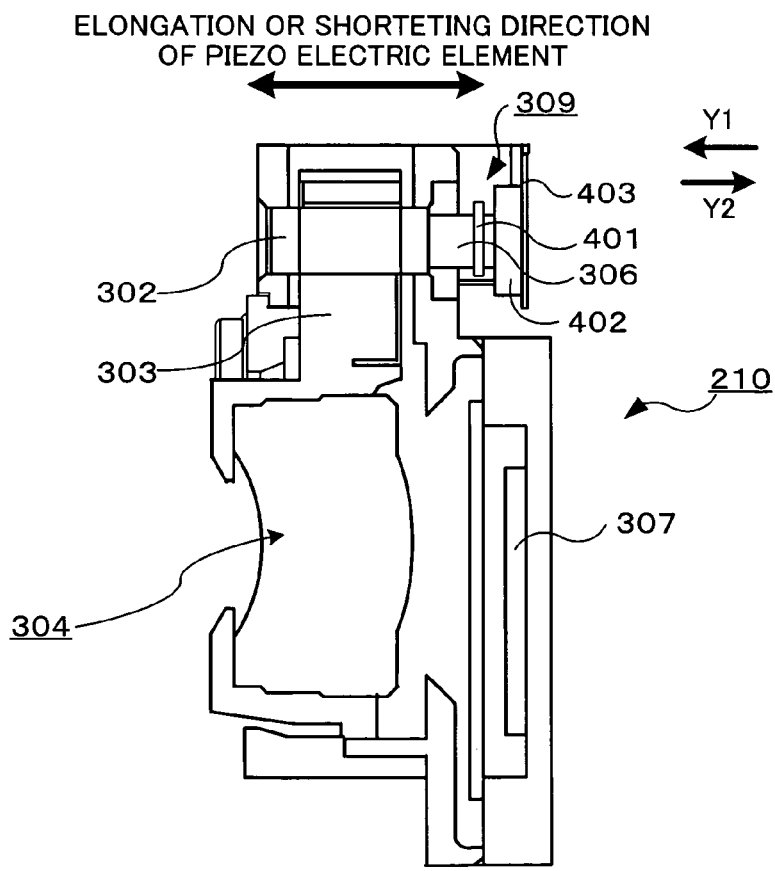

FIGS. 2A and 2B illustrate the configuration of the camera unit 210. FIG. 2A illustrates the front configuration of the camera unit 210, and FIG. 2B illustrates the side configuration of the camera unit 210. As illustrated in FIGS. 2A, 2B, the camera unit 210 has an imaging circuit 307, a lens system (hereinafter, simply called "lens") 304 which guides an external light to the imaging circuit 307, and a drive mechanism 309 which moves the position of the lens 304 in the optical direction thereof.

The imaging circuit 307 comprises an aggregate of regularly arranged photo-electric devices, such as a CCD (Charged Coupled Device) and a CMOS (Complementary Metal Oxide Semiconductor), and converts an incoming light into dot matrix data (digital image data).

The lens 304 is housed by a lens holder 303, and moves together with the lens holder 303. As the lens 304 moves, the image size of the object to be shot by the imaging circuit 307 (angle of view that the object is shot) changes. That is, a zoom magnification changes.

The drive mechanism 309 comprises a vibration type actuator which has a piezoelectric element (for example, piezo element) 306, a drive shaft 302, an FPCB (Flexible Print Circuit Board) 401, a spindle 402, an SUS (Super Use Stainless steel) plate 403, a presser plate 301, and a presser bar spring 305. The drive mechanism 309 moves the lens 304 in the optical direction thereof.

The piezoelectric element 306 elongates or shortens in accordance with an applied voltage. The drive shaft 302 is fixed and bonded to one surface of the piezoelectric element 306, and sandwiched between the lens holder 303 and the presser plate 301 so as to be fixed. The FPCB 401 is a drive circuit which generates a drive signal for driving the piezoelectric element 306, and is fixed to the other surface of the piezoelectric element 306. The spindle 402 is fixed to the FPCB 401, and supports the drive shaft 302. The SUS plate 403 comprises a metallic tabular member, and fixes the spindle 402 to the camera unit 210.

The presser plate 301 sandwiches the drive shaft 302 together with the lens holder 303 and fixes the drive shaft 302. The presser bar spring 305 pulls the presser plate 301 downward the figure (direction to the lens holder 303), and gives appropriate friction between the lens holder 303 and the drive shaft 302.

Figure 3A:
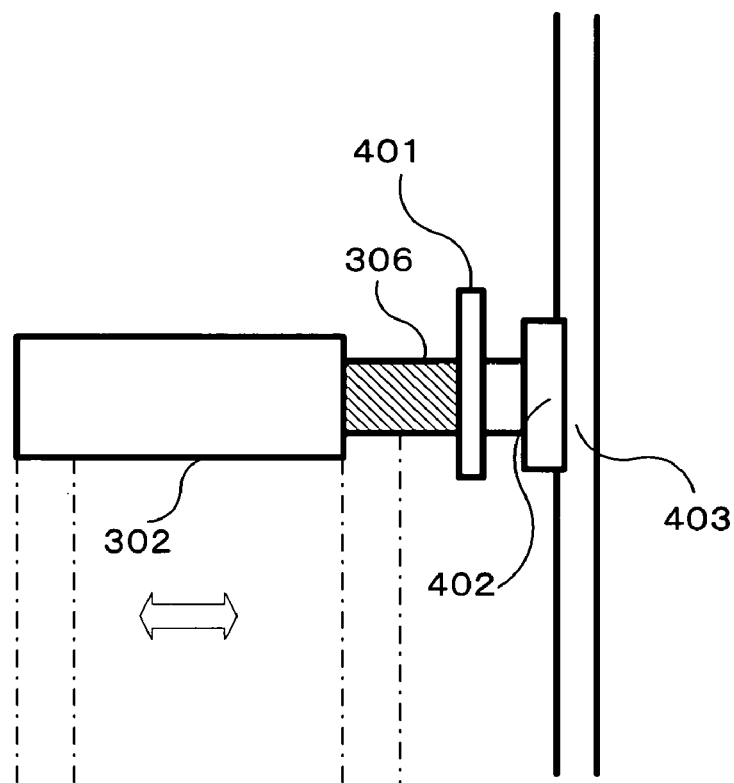
FIGS. 3A and 3B are diagrams illustrating the cellular phone of the first embodiment of the invention with a drive shaft elongated and shrunk.
Figure 3B:
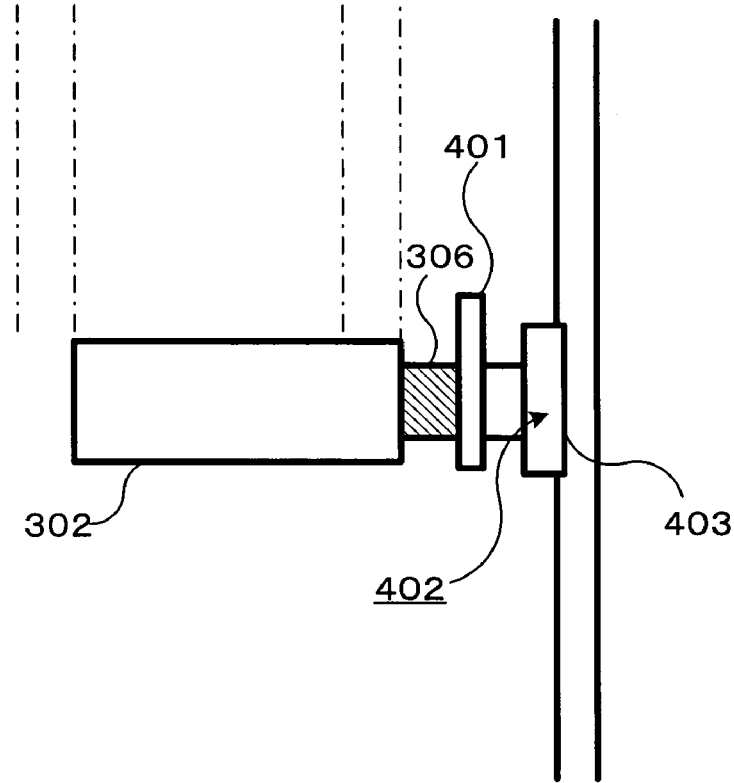

As illustrated in FIGS. 3A and 3B, the piezoelectric element 306 elongates or shortens by a control (drive) signal from the FPCB 401. The position of the drive shaft 302 moves along with elongation or shortening of the piezoelectric element 306.

As the piezoelectric element 306 elongates or shortens at a low speed and the drive shaft 302 moves at a low speed, friction between the drive shaft 302 and the lens holder 303 moves the lens holder 303 in the elongation or shortening direction. When the piezoelectric element 306 elongates or shortens at a high speed, however, a frictional portion slips because of inertia, so that the lens holder 303 hardly moves, and remains at the approximately same position.

Specifically, the lens 304 can move to a direction indicated by a symbol Y1 in FIG. 2B, i.e., a direction in which the lens 304 moves away from the imaging circuit 307 by repeating an operation of changing a state from a state illustrated in FIG. 3A to a state illustrated in FIG. 3B at a high speed, and from a state of FIG. 3B to a state of FIG. 3A at a low speed. Likewise, the lens 304 can move in a direction indicated by a symbol Y2 in FIG. 2B, i.e., a direction in which the lens 304 comes close to the imaging circuit 307 by repeating an operation of changing a state from the state illustrated in FIG. 3B to the state illustrated in FIG. 3A at a high speed, and from the state of FIG. 3A to the state of FIG. 3B at a low speed.

The camera unit 210 has a position measuring mechanism for measuring the position of the lens 304. The position measuring mechanism comprises a magnet 310 (illustrated in FIG. 2A) fixed to the lens holder 303, and a Hall element 308 disposed at the outer flame of the camera unit 210. A distance between the magnet 310 and the Hall element 308 changes in accordance with the position of the lens holder 303, and a magnetic field intensity detected by the Hall element 308 changes in accordance with the change in the distance. Accordingly, the position measuring mechanism can acquire the position of the lens holder 303 based on the magnetic field intensity detected by the Hall element 308.

Next, the circuit structure of the cellular phone 200 will be explained.

Figure 4:
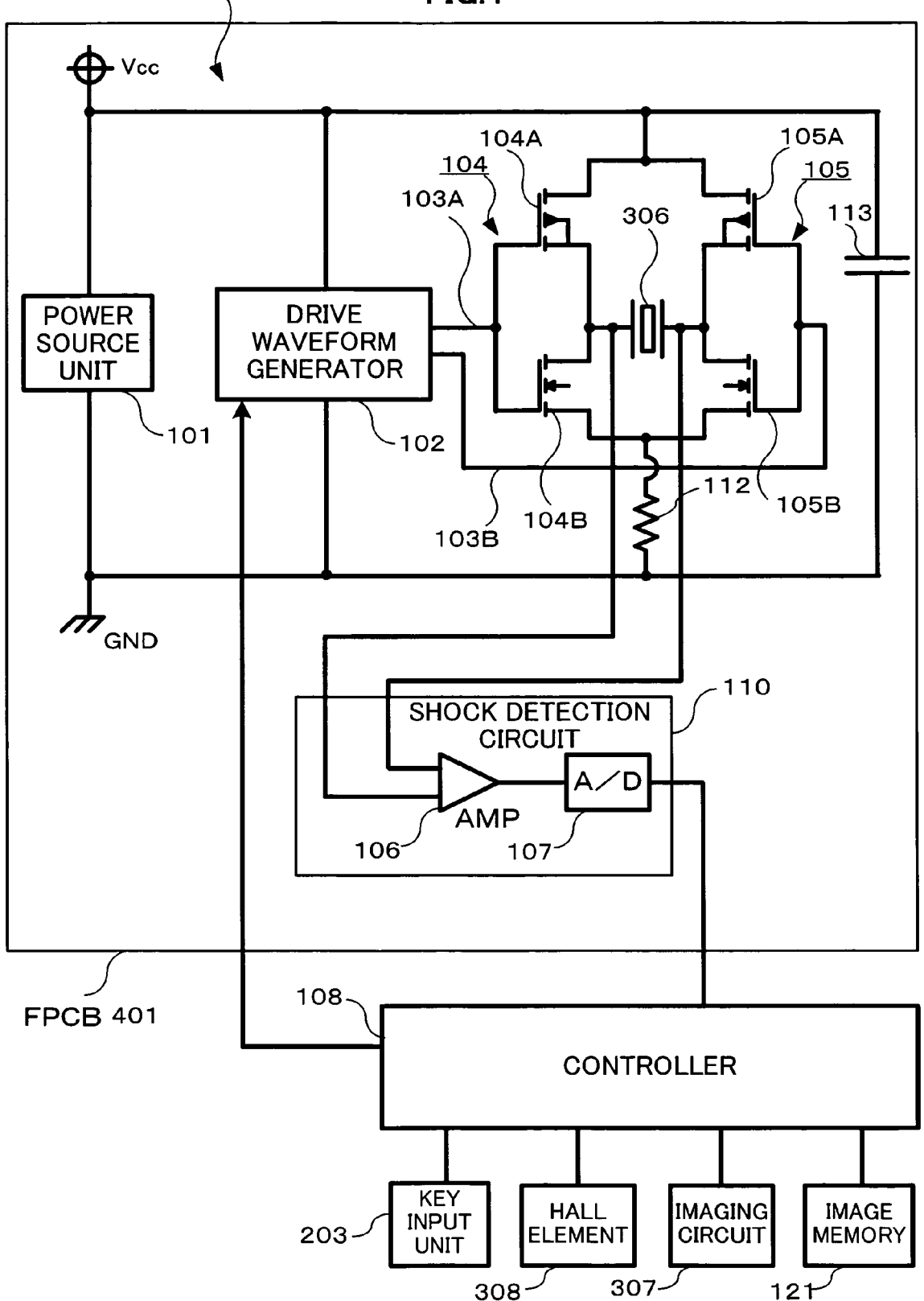
FIG. 4 is a diagram illustrating an example of the structure of the cellular phone according to the first embodiment of the invention, and an example of the structure of an electronic circuit.

As illustrated in FIG. 4, the internal circuit of the cellular phone 200 has, for example, a controller 108, the key input unit 203, the imaging circuit 307, the Hall element 308, an image memory 121, a shock detection circuit 110, a drive circuit 111.

The controller 108 comprises a CPU (Central Processing Unit), a RAM (Random Access Memory), a ROM (Read Only Memory), and the like, runs an operation program stored in the ROM, and controls each unit of the cellular phone 200. In particular, in the embodiment, the controller 108 executes various processes for imaging the object in accordance with an instruction from the key input unit 203. For example, the controller 108 controls the drive circuit 111 in response to a manipulation of the cursor key 208D, and has the piezoelectric element 306 elongate and shorten to adjust the position of the lens 304. In response to a detection signal from the shock detection circuit 110, the controller 108 readjust the position of the lens 304. Further, in response to an instruction from the key input section 203, the controller 108 executes a process of, for example, acquiring an image imaged by the imaging circuit 307 and storing the image in the image memory 121. The details of those processes will be discussed later.

The key input unit 203 supplies the controller 108 with a camera activation instruction in response to a manipulation of the camera key 208A by the user, a shutter instruction (image acquisition instruction) in response to a manipulation of the set key 208B, a zoom-in (increasing zoom magnification)/zoom-out (reducing zoom magnification) instruction in response to a manipulation of the cursor key 208D.

The imaging circuit 307 supplies image data obtained by imaging the object to the image memory 121 under the control of the controller 108.

The Hall element 308 supplies the controller 108 with a signal indicating the position of the lens 304 based on the detected magnetic field intensity.

The image memory 121 comprises, for example, a flash memory, and stores the image data obtained by the imaging operation of the imaging circuit 307. The image memory 121 may be a removable recording medium.

The drive circuit 111 is mounted on the FPCB 401, generates a drive signal for moving the lens 304 in accordance with an instruction from the controller 108, and supplies the drive signal to the piezoelectric element 306.

The drive circuit 111 comprises, for example, a power source unit 101, a drive waveform generator 102, a first inverter circuit 104, a second inverter circuit 105, a current limiting resistor 112, and a capacitor 112 for stabilizing a power.

Each of the inverter circuits 104, 105 is an inverter circuit of a CMOS (Complementary Metal Oxide Semiconductor) comprising P-channel MOSFETS (Metal Oxide Semiconductor Field Effect Transistor) 104A, 105A and N-channel MOSFETS 104B, 105B.

The power source unit 101 supplies a power source voltage Vcc to an electronic circuit. The drive waveform generator 102 generates a pair of drive signals for controlling the piezoelectric element 306 in response to an instruction from the controller 108. The power source unit 101 supplies one of the drive signals to the first inverter circuit 104 through a wire 103A, and the other drive signal to the second inverter circuit 105 through a wire 103B. If the voltage of the signal supplied to the gate electrodes of the MOSFETS 104A, 104B is high level, only the N-channel MOSFET 104B turns ON, and the voltage of the electrode of the piezoelectric element 306 on the left of the figure (first inverter circuit 104 side) becomes low level. On the other hand, if the voltage of the signal supplied to the gate electrodes of the MOSFETS 104A, 104B is low level, only the P-channel MOSFET 104A turns ON, and the voltage on the left of the figure (first inverter circuit 104 side) of the piezoelectric element 306 becomes almost equal to the power source voltage Vcc.

Likewise, if the voltage of the signal supplied to the gate electrodes of the MOSFETS 105A, 105B is high level, only the N-channel MOSFET 105B turns ON, and the voltage of the right side (second inverter circuit 105 side) electrode of the piezoelectric element 306 becomes low level. On the other hand, if the voltage of the signal supplied to the gate electrodes of the MOSFETS 105A, 105B is low level, only the P-channel MOSFET 105A turns ON, and the voltage of the right side (second inverter circuit 105 side) electrode of the piezoelectric element 306 becomes almost equal to the power source voltage Vcc.

Figure 5:
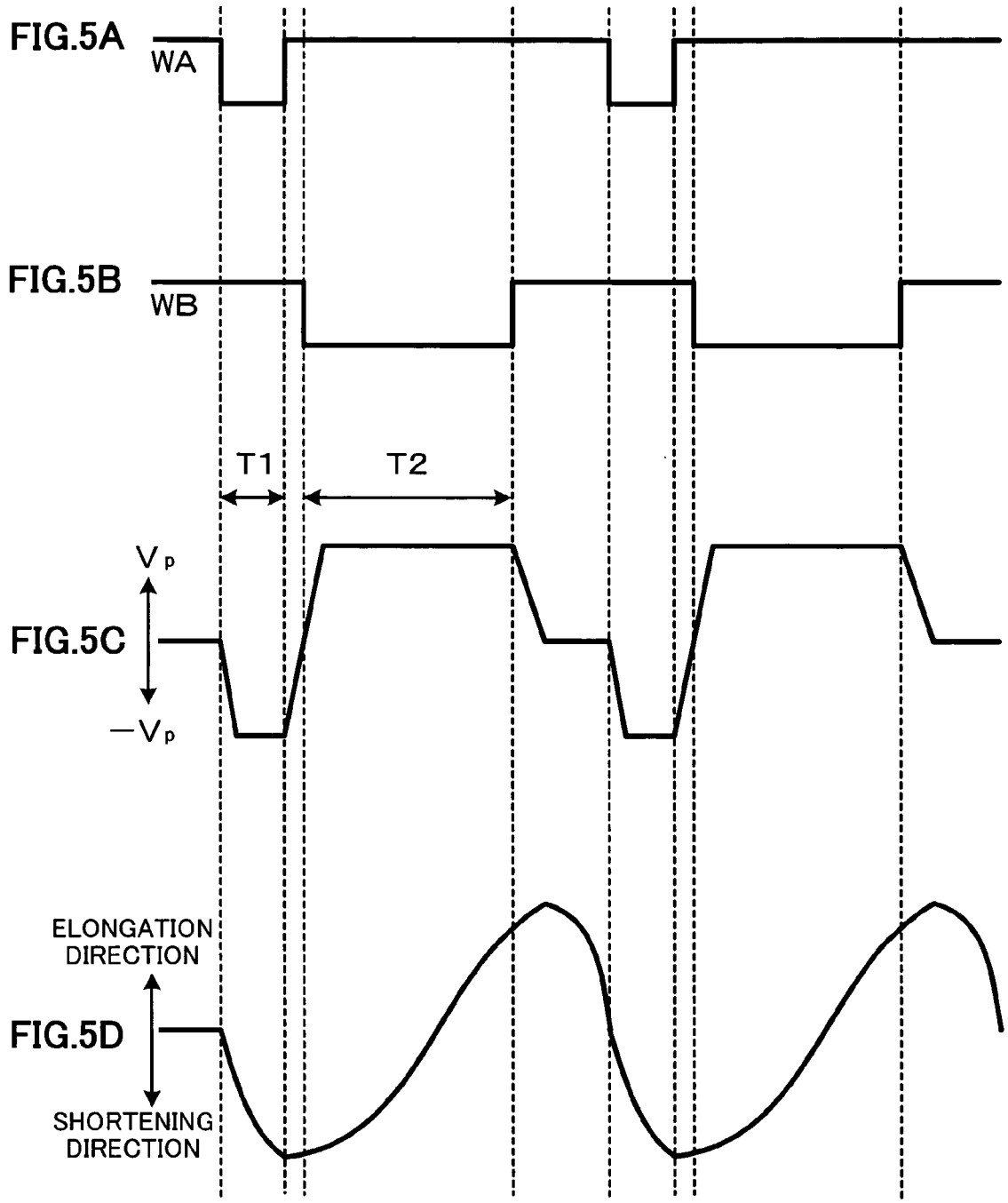
FIGS. 5A to 5D are timing charts exemplifying the voltage waveforms of signals generated by a drive waveform generator of the cellular phone according to the first embodiment of the invention, and generation timings.

For example, as the drive waveform generator 102 receives an instruction on zoom-in (increasing the zoom magnification) from the controller 108, two independent voltage waveforms WA, WB as illustrated in FIGS. 5A, 5B are generated. The horizontal axes of the figures denote times, and the vertical axes of the figures denote voltages. The drive waveform generator 102 supplies the voltage waveform WA in FIG. 5A to the first inverter circuit 104 through the wire 103A, and the voltage waveform WB in FIG. 5B to the second inverter circuit 105 through the wire 103B. Because of both voltage waveforms WA, WB, a voltage illustrated in FIG. 5C is applied between both electrodes of the piezoelectric element 306. It is supposed that a state where the voltage of the right side (second inverter circuit 105 side) electrode of the piezoelectric element 306 is higher than the voltage of the left side (first inverter circuit 104 side) electrode is a positive state. If the voltage waveform WA is low level, and the voltage waveform WB is high level, an applied voltage to the piezoelectric element 306 becomes −Vp. If the voltage waveform WA is high level, and the voltage waveform WB is low level, the applied voltage to the piezoelectric element 306 becomes +Vp.

As a voltage illustrated in FIG. 5C is applied to the piezoelectric element 306, the piezoelectric element 306 repeats an operation of shortening at a high speed as illustrated in FIG. 5D, and elongating at a low speed. As a result, the lens holder 303 and the lens 304 move frontward (left in FIG. 2B), so that the lens 304 moves away from the imaging circuit 307.

As the drive waveform generator 102 receives an instruction on zoom-out (decreasing the zoom magnification) from the controller 108, the drive waveform generator 102 supplies the voltage waveform WA illustrated in FIG. 5A to the first inverter circuit 104 through the wire 103A, and the voltage waveform WB illustrated in FIG. 5B to the second inverter circuit 105 through the wire 103B. Accordingly, a voltage which inverts the polarity of the voltage waveform illustrated in FIG. 5C is applied to the piezoelectric element 306, and the displacement of the piezoelectric element 306 becomes in such a shape that a displacement illustrated in FIG. 5D is inverted up and down. That is, the piezoelectric element 306 repeats an operation of elongating at a high speed and shortening at a low speed. Therefore, the lens holder 303 and the lens 304 moves backward (right in FIG. 2B), and the lens 304 gradually comes close to the imaging circuit 307.

The shock detection circuit 110 is mounted on the FPCB 401, and detects a shock (external force) from the exterior of the cellular phone 200. As mentioned above, the position of the lens 304 is kept by the friction between the lens holder 303 and the drive shaft 102. Therefore, as external force like a shock is applied, the lens 304 is likely to be positioned at a wrong position. Consequently, the shock detection circuit 110 detects a shock, and notifies the controller 108.

The piezoelectric element 306 has a characteristic such that it deforms in accordance with an applied voltage, and a characteristic such that it generates a voltage when deformed by application of external force. The shock detection circuit 110 utilizes the characteristics of the piezoelectric element 306 to detect external force. The shock detection circuit 110 comprises an operational amplifier 106 which amplifies a potential difference between both electrodes of the piezoelectric element 306, and an A/D converter 107 which performs analog-to-digital conversion on an output voltage of the operational amplifier 106. The shock detection circuit 110 is mounted on the FPCB 401. By driving the lens 304 and detecting a shock with the same piezoelectric element 306, the elongation or shortening direction of the piezoelectric element 306 can be oriented to the direction of vibration originating from an external shock applied to the piezoelectric element 306. Accordingly, a space for the FPCB 401 can be saved.

The operational amplifier 106 amplifies a minute voltage difference generated at the piezoelectric element 306, and supplies the amplified voltage difference to the A/D converter 107. The A/D converter 107 converts the supplied voltage difference (analog value) into a digital value, and supplies the digital value to the controller 108. The controller 108 determines whether or not the power of the piezoelectric element 306 is larger than or equal to a level from the digital value supplied from the A/D converter 107, thereby determining whether or not any shocks and external forces are applied to the movable direction of the lens 304.

Next, the operation of the cellular phone 200 employing the foregoing structure will be explained with reference to the flowchart in FIG. 7.

For example, when the user wants to take a photo by the camera of the cellular phone 200, the user presses down the camera key 208A. In response to this key manipulation, the controller 108 sets a mode at an imaging mode (mode allowing imaging of the object), and activates the camera unit 210. As the set key 208B is pressed down and the imaging is performed, the controller 108 stores image data acquired by the imaging circuit 307 in the image memory 121, supplies the data to the main display unit 202, and displays an image. When the user wants to image an image enlarged or reduced, it is possible to change the magnification by appropriately manipulating the cursor key 208D. This will be explained in detail below.

(Magnification Changing Process)

Figure 6:
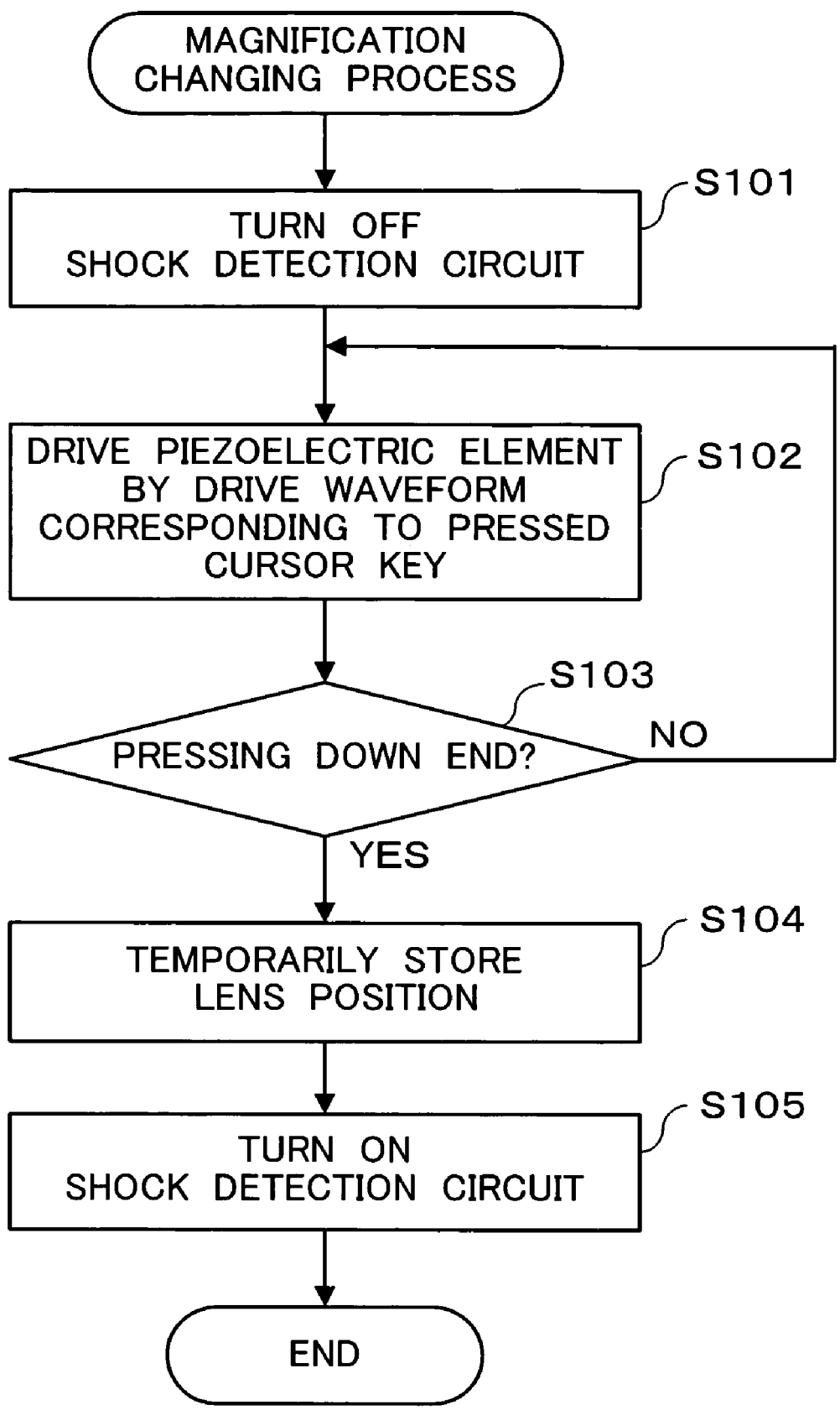
FIG. 6 is a flowchart illustrating a process executed by a controller of the cellular phone of the first embodiment of the invention when driving a lens to change a zoom magnification.

For example, as the cursor key 208D is pressed down and an instruction on changing the imaging magnification is given, the controller 108 starts a process illustrated in a flowchart in FIG. 6. First, the controller 108 turns OFF the shock detection circuit 110 (step S101). A scheme of turning OFF is arbitrary like stopping supply of the power, and masking an input signal to the controller 108. The reason why the shock detection circuit 110 is turned OFF is to prevent the controller 108 from falsely detecting a drive signal generated by the drive waveform generator 102 as a voltage originating from a shock.

Next, the controller 108 executes a process (piezo drive process) of driving the piezoelectric element 306 by a drive signal corresponding to the pressed cursor key 208D (step S102). For example, as the upper portion of the cursor key 208D is pressed down, the controller 108 determines that an instruction on zoom-in is given, and controls the drive waveform generator 102 in such a way that the drive waveforms WA, WB illustrated in FIG. 5A, 5B are supplied to the respective inverter circuits 104, 105. As the bottom portion of the cursor key 208D is pressed down, the controller 108 determines that an instruction on zoom-out is given, and controls the drive waveform generator 102 in such a way that the drive waveforms WA, WB illustrated in FIGS. 5A, 5B are supplied to the respective inverter circuits 105, 104. The voltage waveform illustrated in FIG. 5C or an inverted voltage waveform is applied to the piezoelectric element 306. The drive waveform differs depending on the direction in which the lens 304 moves and the amount of movement (the number of pulses generated). In this manner, the piezoelectric element 306 repeats elongation or shortening, so that the controller 108 controls the position of the lens 304.

The controller 108 determines whether or not a process of moving the lens 304 ends, i.e., whether or not pressing of the cursor key 208D is finished, or whether or not the lens 304 reaches the boundary of the movable range (dead end) (step S103). The controller 108 can determines whether the lens 304 reaches the dead end or not based on the detection level of the magnetic field intensity by the Hall element 308. When determining that it is not finished yet (step S103; NO), the controller 108 continues a process at the step S102. The user moves the lens 304 to a desired position, and can shoot the object at a desired zoom magnification.

It is supposed that the depth of field of the lens 304 is deep and the object is always focused within the movable range of the lens 304.

In the step S103, when it is determined that the process ends (step S103; YES), the controller 108 acquires an output voltage of the Hall element 308, and stores an acquired value in the RAM (step S104). This value indicates the position of the lens 304 when the process of moving the lens 304 ends. Subsequently, the controller 108 turns ON the shock detection circuit 110 (step S105), and sets the shock detection circuit 110 in a state capable of measuring the electromotive voltage of the piezoelectric element 306.

(Imaging Process)

Figure 7A:
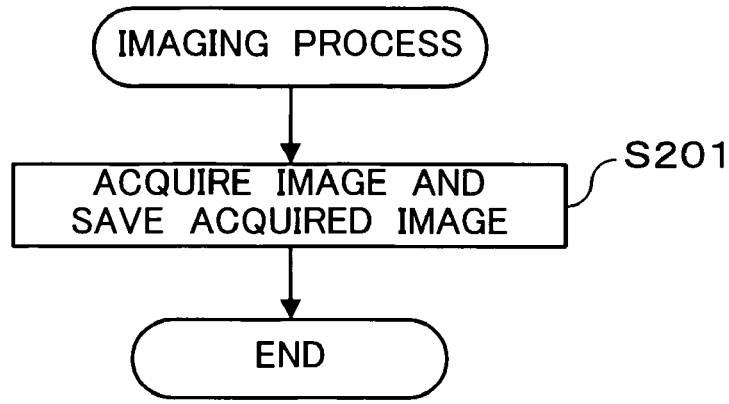
FIG. 7A is a flowchart illustrating an imaging process of the cellular phone of the first embodiment of the invention.

For example, as the set key 208B is pressed down, and an instruction on imaging the object is given, the controller 108 starts a process illustrated in FIG. 7A. The controller 108 acquires image data obtained by imaging operation of the imaging circuit 307, and stores this data into the image memory 121 (step S201). The format of the image data stored in the image memory 121 is arbitrary. The image memory 121 can store plural pieces of image data as separate electric files.

(Shock Detection Interruption Process)

Figure 7B:
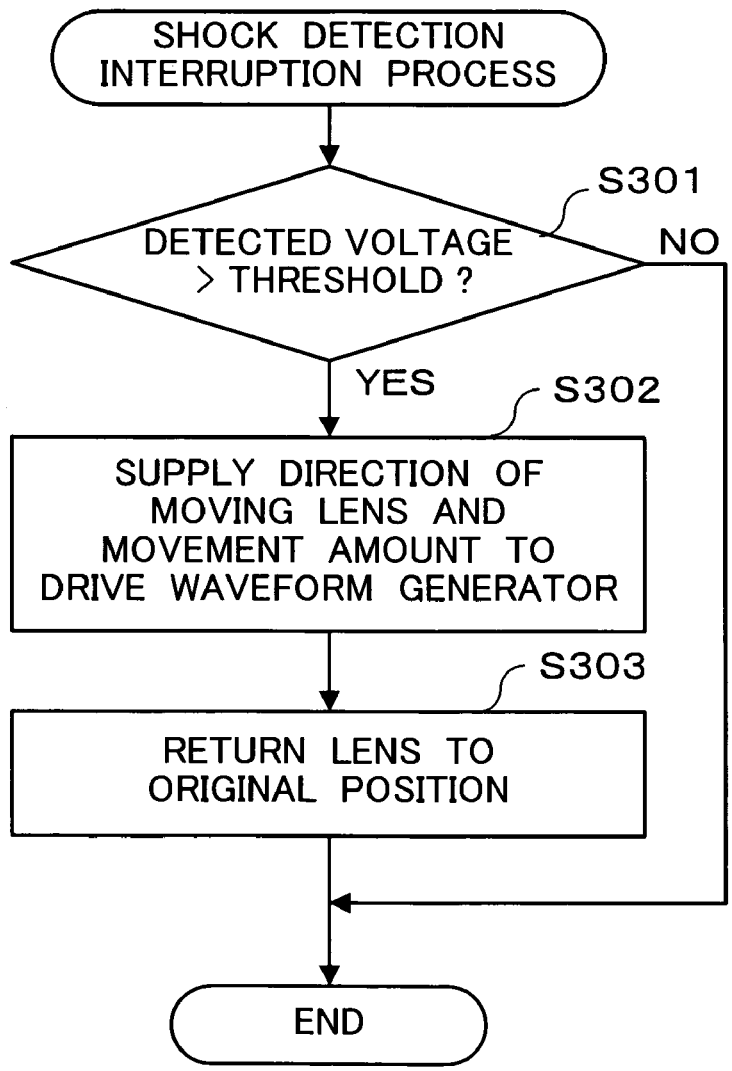
FIG. 7B is a flowchart illustrating a shock detection interruption process of the cellular phone of the first embodiment of the invention.

Next, an operation of detecting an external shock and adjusting the position of the lens 304 will be explained with reference to FIG. 7B. In this embodiment, the controller 108 starts this process as receiving an interruption signal indicating detection of a shock. Or, the controller 108 may execute this process at periodical timings. The timing of executing this process is not limited to those cases.

As any external shocks or external forces are applied to the cellular phone 200 while the user uses the camera of the cellular phone 200 and images the object, the piezoelectric element 306 is distorted, and a minute voltage is generated. The operational amplifier 106 amplifies the minute voltage generated by the piezoelectric element 306, and supplies the amplified voltage to the A/D converter 107. The A/D converter 107 converts the supplied voltage (analog value) into a digital value, and supplies the digital value to the controller 108. This will be explained in detail below.

First, the controller 108 determines whether or not the digital value of the amplified voltage generated by an external shock is larger than a predetermined threshold (step S301). The threshold is set beforehand, and set at the smallest value in such a way that the imaging lens 304 moves.

When having determined that the digital value supplied from the A/D converter 107 is larger than the threshold (step S301; YES), the controller 108 acquires the direction of moving the lens 304 and the amount of movement from a difference between the position of the lens 304 temporarily stored in the RAM and the current position of the lens 304 obtained based on the magnetic field intensity detected by the Hall element 308, and supplies the acquired direction and amount to the drive waveform generator 102 (step S302).

The drive waveform generator 102 generates a drive voltage waveform for moving the lens 304 to the original position based on the direction of moving the lens 304 and the amount of movement, and moves the lens 304 (step S303). The controller 108 may monitor the magnetic field intensity detected by the Hall element 308, and control the drive waveform generator 102 in such a way that a drive voltage is supplied until the lens 304 returns to an appropriate position.

In contrast, when having determined that the digital value supplied from the A/D converter 107 is smaller than the threshold (step S301; NO), the controller 108 does not correct the position of the lens 304, and terminates the shock detection interruption process.

As explained above, the controller 108 of the cellular phone 200 according to the embodiment determines whether or not the value supplied from the shock detection circuit 110 is larger than the predetermined threshold, thereby detecting positional misalignment of the lens 304. When having detected the positional misalignment, the controller 108 sets the lens 304 to the original position again, and this makes it possible to prevent a trouble such that a shooting is performed with a misadjusted zoom magnification.

By driving the lens 304 and detecting a shock with the same piezoelectric element 306, the elongation or shortening direction of the piezoelectric element 306 can be matched with the direction in which the lens 304 possibly moves by a shock, so that a space can be saved. It is not necessary to dispose a stopper or the like to fix the position of the lens 304, and this facilitates miniaturization and reduction in weight.

Second Embodiment

The first embodiment explains the camera unit 210 structured in such a way that the depth of field of the lens 304 is deep and the object is always focused within the movable range of the lens 304, but the invention can be applied to a further high performance camera unit. For example, the invention can be applied to a camera unit which can separately adjust a zoom and a focus.

In this embodiment, a plurality of lenses 304 each of which can adjust the position thereof are disposed at the position of the lens 304 illustrated in FIG. 2. A vibration actuator and a drive circuit are disposed with respect to each lens, and the position of each lens 304 is detected. By disposing the vibration type actuator and the drive circuit with respect to each lens 304, it is possible to separately control changing of a zoom magnification and adjustment of a focus. Accordingly, as the depth of field of the lenses 304 may not be deep, the camera of the cellular phone 200 can shoot a further sharp image. The shock detection circuit 110 may detect the electromotive voltage of any arbitrary one of piezoelectric elements 306.

A process executed by the controller 108 of the camera unit having such a structure will now be explained.

When wanting to take a picture with the camera of the cellular phone 200, the user presses down the camera key 208A. Accordingly, the cellular phone 200 is set at a mode of imaging an object, and the camera unit 210 activates. When the user wants to change the zoom magnification, the user presses down the cursor key 208D. The controller 108 executes the aforementioned magnification changing process, supplies drive signals to the respective piezoelectric elements 306, and, for example, moves each lens 304 in the same direction and changes the zoom magnification (step S102). The drive method of each lens 304 is as same as that of the first embodiment. As movement of each lens 304 is finished, the controller 108 stores the position of each lens 304 (step S104).

Figure 8:
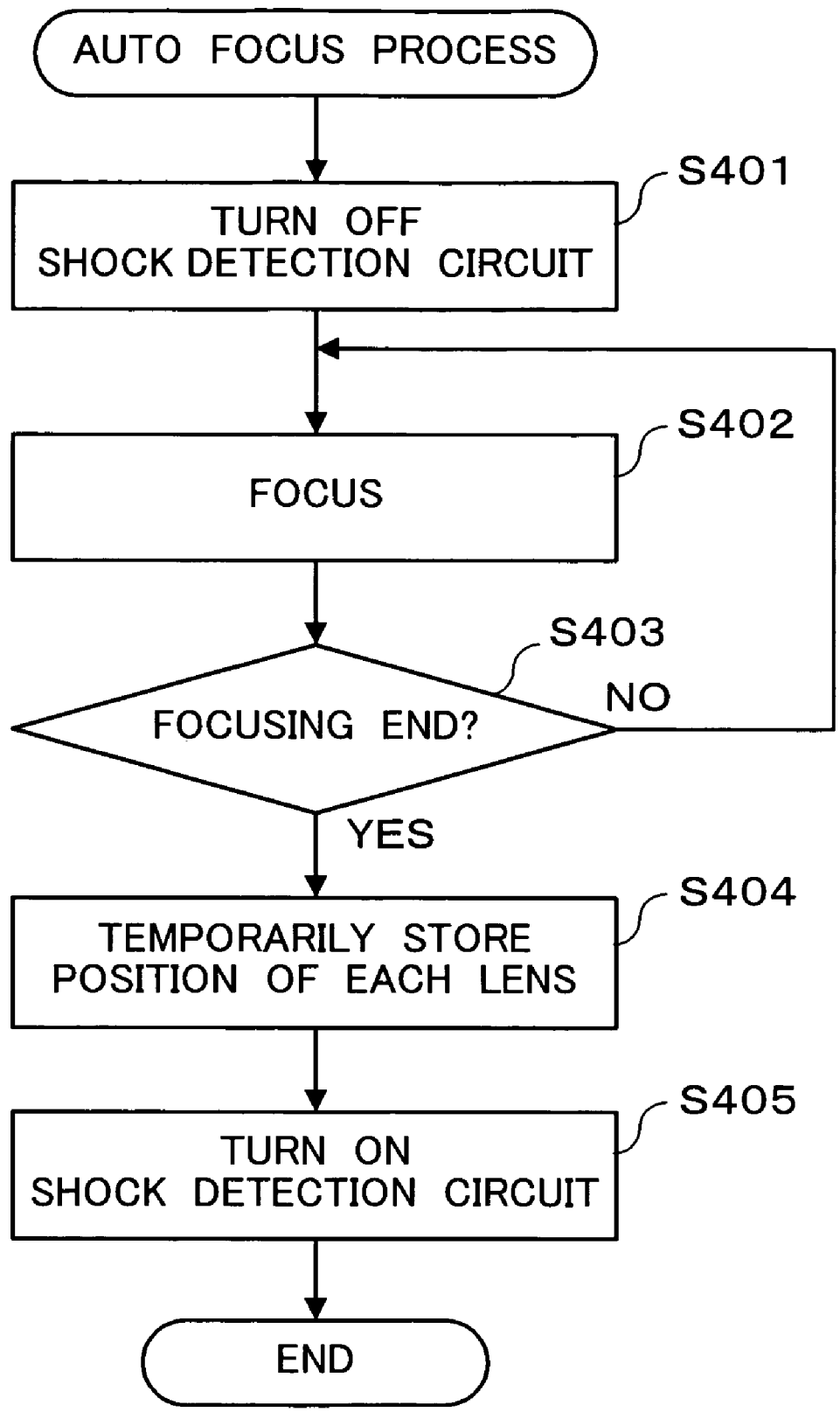
FIG. 8 is a flowchart illustrating a lens drive process of driving a plurality of lenses of a cellular phone according to a second embodiment of the invention.

Because the depth of field of the lenses 304 may not be deep in the embodiment, as the zoom magnification is changed, the camera possibly becomes out of focus. Accordingly, the user presses down the auto focus lock key 208C in accordance with necessity. In response to this user's manipulation, the controller 108 starts an auto focus process illustrated in FIG. 8.

(Auto Focus Process)

First, the controller 108 turns OFF the shock detection circuit 110 (step S401). Subsequently, the controller 108 moves any one of the lenses 304 by driving any one of the piezoelectric elements 306, and focuses an image to be imaged by the imaging circuit 307 (step S402). If the camera is out of focus (step S403; NO), the controller 108 repeats the process of the step S402, and if the object is focused (step S403; YES), the controller 108 shifts the flow to the next process. A scheme of focusing is arbitrary, and, for example, a scheme of taking a state where dispersion of the brightness of each pixel of an image shot by the imaging circuit 307 is largest as a focused state can be employed. Other schemes like a scheme of using the contrast of brightness, and a scheme of detecting the phase difference of a light may be used for focusing.

Next, when focusing is finished (step S403; YES), the positions of the individual lenses 304 in this focused state are temporarily stored in the RAM (step S404).

Subsequently, the controller 108 turns ON the shock detection circuit 110 (step S405), and terminates the process.

As any shocks or external forces are applied to the cellular phone 200 while the controller 108 is executing the auto focus process, the shock detection circuit 110 notifies the controller 108 that a shock is detected. The controller 108 starts the aforementioned shock detection interruption process. That is, the controller 108 determines whether or not a voltage value detected because of the shock is larger than the predetermined threshold (step S301). When having determined that the voltage value is larger than the threshold (step S301; YES), the controller 108 has the drive waveform generator generate a drive signal for moving the position of each lens 304 to the position of each lens 304 stored in the RAM (position of each lens 304 measured recently) (step S302). The piezoelectric element 306 elongates or shortens in accordance with the input drive signal, and the lens 304 returns to the original position (step S303).

Employing such a structure makes it possible to return the position of each lens 304 to an appropriate position after zoom adjustment or focusing even if an external shock is applied to the cellular phone 200.

Third Embodiment

Figure 9:
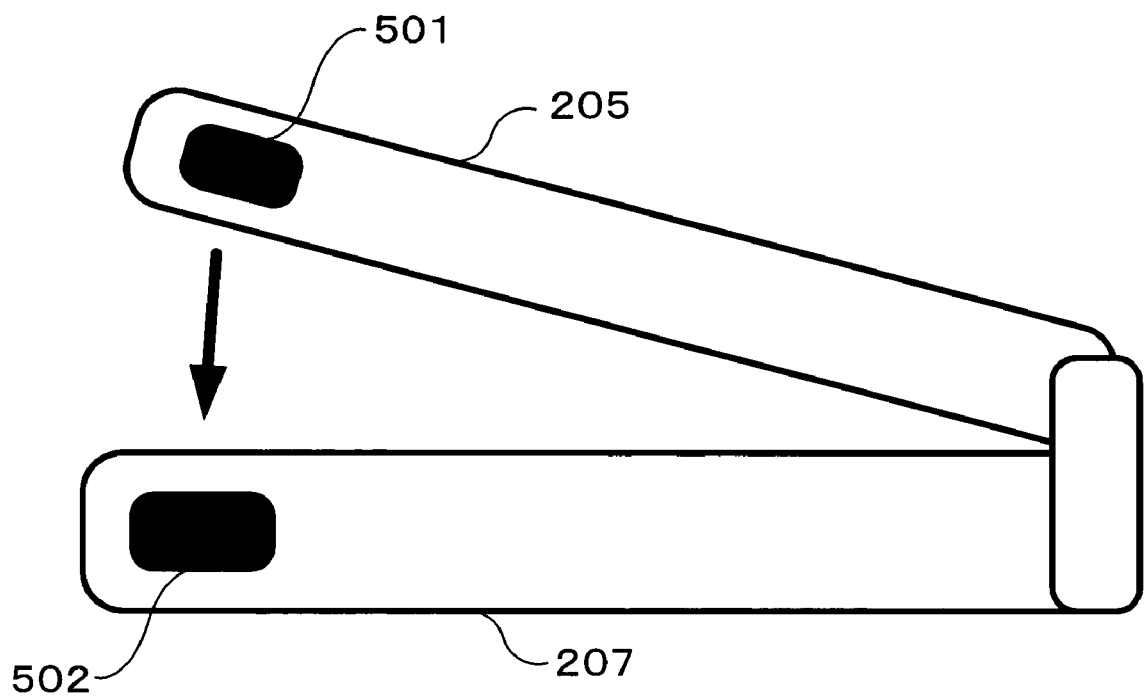
FIG. 9 is a diagram illustrating an example of displacement of an open/close detection magnet and an open/close detection Hall device of a cellular phone according to a third embodiment of the invention.

Next, the other embodiment of the invention will be explained. In the embodiment, the cellular phone 200 can detect a vibration and a shock originating from opening/closing of the lid 205, and adjust the position of the lens 304. As illustrated in FIG. 9, an opening/closing detection magnet 501 and an opening/closing detection Hall element 502 are respectively embedded in the lid 205, and the main body 207, of the cellular phone 200. A distance between the opening/closing detection magnet 501 and the opening/closing Hall element 502 varies in accordance with opening/closing of the lid 205. A magnetic field intensity detected by the opening/closing detection Hall element 502 changes in accordance with the change of the distance. The controller 108 determines the opened/closed state of the lid 205 of the cellular phone 200 from an output voltage of the opening/closing detection Hall element 502. The cellular phone 200 can image an object by the camera unit 210 with the lid 205 opened or closed.

Figure 10:
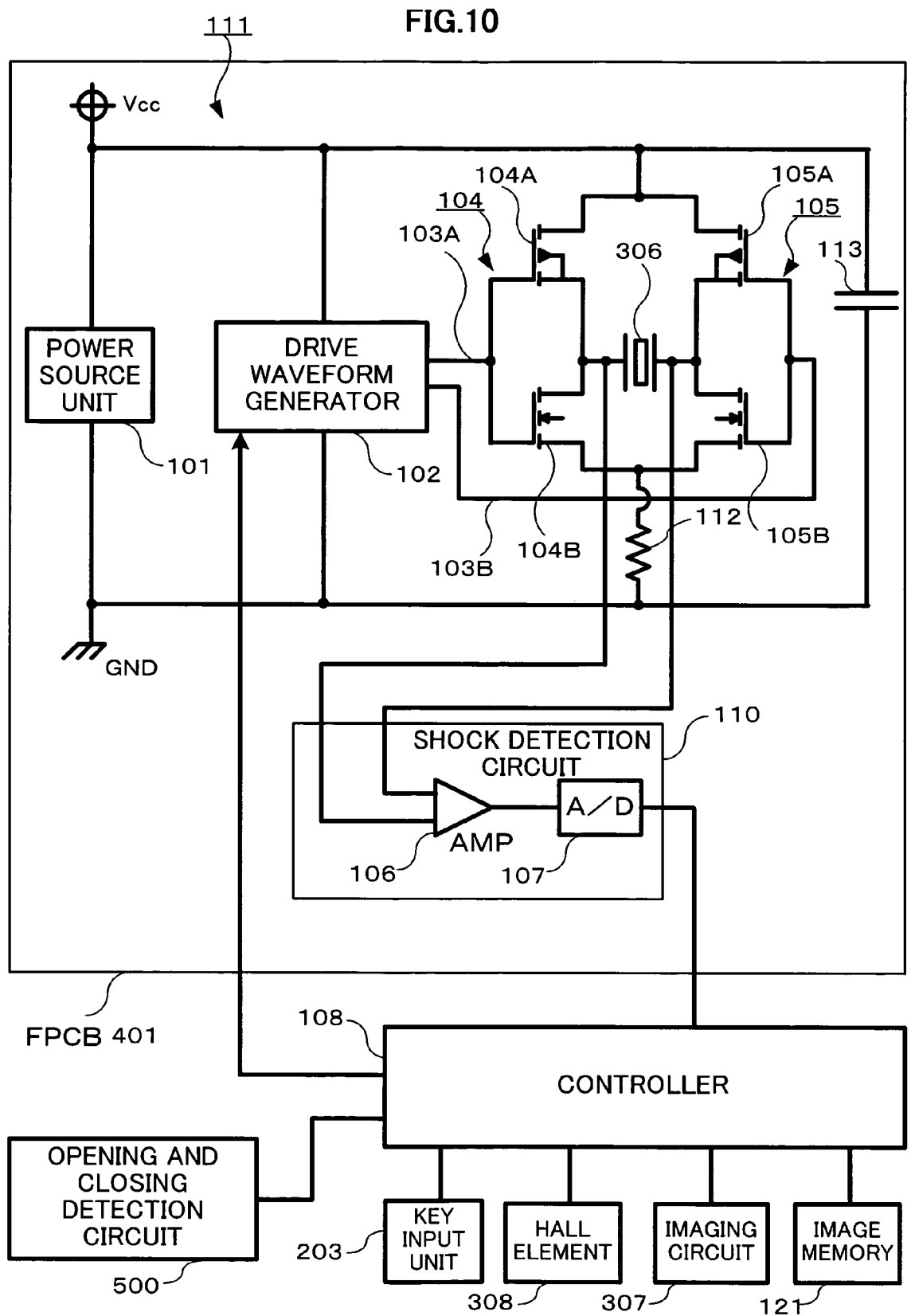
FIG. 10 is a diagram illustrating an example of the structure of the cellular phone of the third embodiment of the invention, and an example of the structure of an electronic circuit.

Next, the circuit structure of the cellular phone 200 of the embodiment will be explained. As illustrated in FIG. 10, the internal circuit of the cellular phone 200 has an opening/closing detection circuit 500 which detects the opened/closed state of the lid 205 in addition to the controller 108, the key input unit 203 for inputting various instructions and information, the imaging circuit 307, the Hall element 308, the image memory 121, and the drive circuit 111.

The controller 108 stores a flag indicating whether or not the camera unit 210 is in a state capable of imaging in the RAM. For example, if the camera unit 210 is supplied with a power and is in a state capable of imaging, the flag is set at 1. If no power is supplied to the camera unit 210, the flag is set at 0.

The opening/closing detection circuit 500 has the opening/closing detection Hall element 502, converts a magnetic field intensity received from the opening or closing detection magnet 501 into a voltage, and supplies the converted voltage to the controller 108. When opening/closing of the lid 205 and the main body 207 is carried out after the camera activates, the lens 304 may be likely to be moved to a wrong position because of a shock of opening or closing. Accordingly, the opening/closing detection circuit 500 detects the opening or closing of the lid 205, and notifies the controller 108.

It is assumed that the cellular phone 200 of the embodiment has the shock detection circuit 110. The cellular phone 200, however, may not have the shock detection circuit 110.

(Opening/Closing Detection Process)

Figure 11:
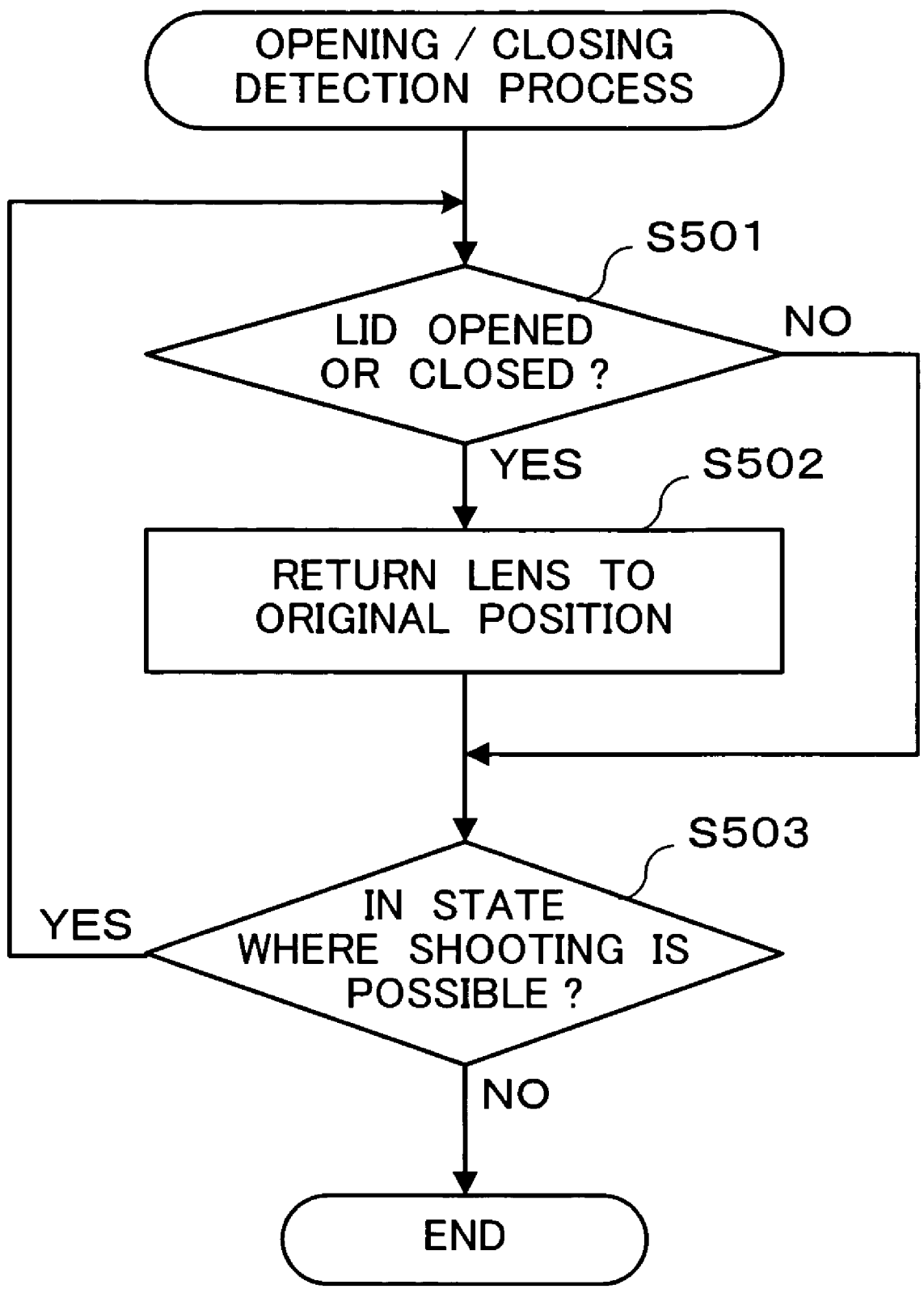
FIG. 11 is a flowchart for explaining an open/close detection process of the cellular phone of the third embodiment of the invention.

The controller controls the opening/closing detection circuit 500, and starts the opening/closing detection process illustrated in a flowchart in FIG. 11. Typically, this process is executed before the shock detection circuit 110 is turned ON in the step S105 after the position of the lens 304 is temporarily stored in the step S104 of the first embodiment. Or, the controller 108 executes this process at periodical timings. When the lid 205, and the main body 207, of the cellular phone 200 are opened or closed, the position of the lens 304 is possibly shifted. The controller 108 executes the process to prevent this positional misalignment. The opening/closing detection circuit 500 converts the magnetic field intensity detected by the opening/closing detection Hall element 502 into a voltage, and the A/D converter 107 or the like converts the voltage into a digital signal, and supplies an acquired voltage value to the controller 108. This will be explained in detail below.

First, the controller 108 determines whether or not the cellular phone 200 is opened or closed (step S501). Specifically, if a voltage value supplied from the opening/closing detection circuit 500 is smaller than a predetermined threshold, the controller 108 determines that the lid 205 is opened. If the voltage value supplied from the opening/closing detection circuit 500 is larger than or equal to the predetermined threshold, the controller 108 determines that the lid 205 is closed. The threshold is a value set beforehand.

When having determined that the cellular phone 200 is opened or closed (step S501; YES), the controller 108 acquires the direction of moving the lens 304 and the amount of movement from a difference between the lens position temporarily stored in the RAM and a current lens position obtained from the magnetic field intensity detected by the Hall element 308, and supplies them to the drive waveform generator 102. That is, the controller 108 moves (returns) the lens 304 to the original position temporarily stored in the RAM (step S502). The controller 108 monitors the magnetic field intensity detected by the Hall element 308, controls the drive waveform generator 102 to elongate or shorten the piezoelectric element 306 until the lens 304 returns to an appropriate position.

Afterward, the controller 108 determines whether or not the camera is in a state capable of shooting (step S503). The controller 108 performs determination by referring to the aforementioned flag indicating whether or not the camera unit 210 is in a state capable of imaging.

When having determined that the cellular phone 200 is not opened or closed (step S501; NO), the controller 108 determines whether or not the camera is in a state capable of shooting without correcting the position of the lens 304 (step S503).

When having determined that it is in a state capable of imaging (step S503; YES), the controller 108 returns the process to the step S301 again, and determines whether or not the lid 205 is opened or closed. When having determined that is it in a state not capable of imaging (imaging mode is terminated) (step S503; NO), the controller 108 terminates the opening/closing detection process.

The controller 108 of the cellular phone 200 of the embodiment determines whether or not the lid 205 is opened or closed from a value supplied from the opening/closing detection circuit 500, and can suppress positional misalignment of the lens 304 when the lid 205 is opened.

It is possible to execute the opening/closing detection process combined with the foregoing auto focus process. Typically, the opening/closing detection process can be executed before the shock detection circuit 110 is turned ON in the step S405 after the position of each lens 304 is temporarily stored in the step S404. Accordingly, by determining whether or not the lid 205 is opened or closed from a value supplied from the opening/closing detection circuit 500, the controller 108 can suppress positional misalignment of each lens 304 when executing the auto focus process. Even if a shock different from a shock originating from the opening/closing is applied, it is possible to return the position of each lens 304 to an appropriate position after recent zoom adjustment or focusing.

The appearance, the mechanical structure, the circuit structure, and the operation of each foregoing unit, the waveforms, and the flowcharts are just examples, can be modified arbitrary if the same operation and effectiveness can be obtained, and are not limited to the foregoing embodiments.

Figures 12A, 12B, 12C, 12D:
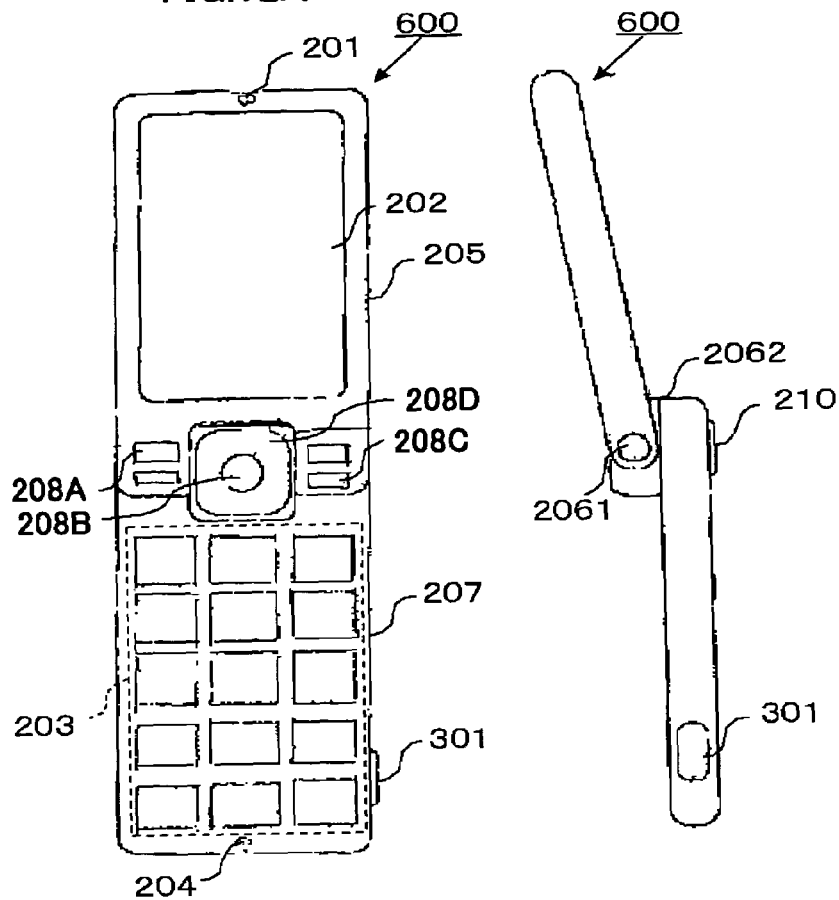
FIGS. 12A to 12D are diagrams illustrating an example of the structure of a cellular phone having two rotation mechanisms.

For example, FIGS. 12A to 12D illustrate a cellular phone 600 which has a rotation mechanism different from the structure of the aforementioned hinge unit 206. A first rotation unit 2061 opens or closes the lid 205 as same as the hinge unit 206. A second rotation unit 2062 rotates the lid 205 in the horizontal direction of the display surface of the main display unit 202 after the first rotation unit 2061 rotates the lid 205. FIG. 12A is a front view illustrating an opened state where the lid 205 is rotated by the first rotation unit 2061. FIG. 12B is a side view illustrating the opened state. FIG. 12C is a front view illustrating a closed state where the lid 205 is rotated by the second rotation unit 2062 from the state illustrated in FIG. 12A and overlapped on the main body 207 with the display surface of the main display unit 202 being as the front. FIG. 12D is a side view of the closed state. The same structural parts as those of each embodiment will be denoted by the same reference numbers, and the explanations of which will be omitted. In those figures, the cellular phone 600 has a shutter key 301, and the user can shoot an object in the opened state or closed state by pressing down the shutter key 301.

When the cellular phone 600 having such a rotation mechanism is transformed from the opened state of FIG. 12A to the closed state of FIG. 12C by the second rotation unit 2062, or from the closed state of FIG. 12C to the opened state of FIG. 12A, a shock is possibly applied to the lens 304 and the piezoelectric element 306. The cellular phone 600 may be structured in such a manner as to set the lens position again by detecting the shock. The lens position may be set again by detecting a shock originating from opening/closing of the first rotation unit 2061.

Figure 13B:
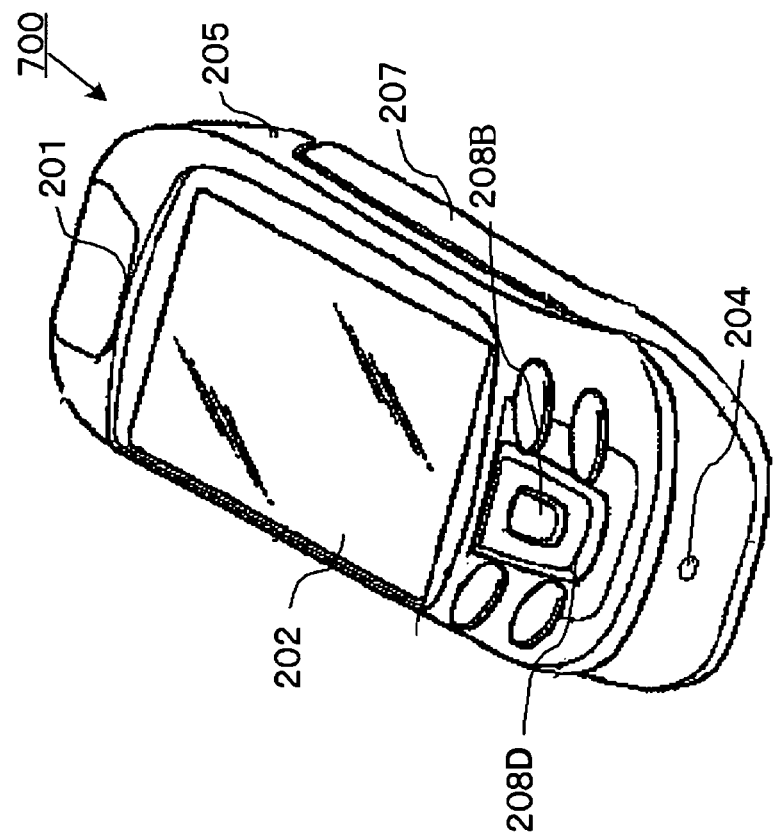
FIGS. 13A and 13B are diagrams illustrating an example of the structure of a cellular phone having a slide mechanism.
Figure 13A:
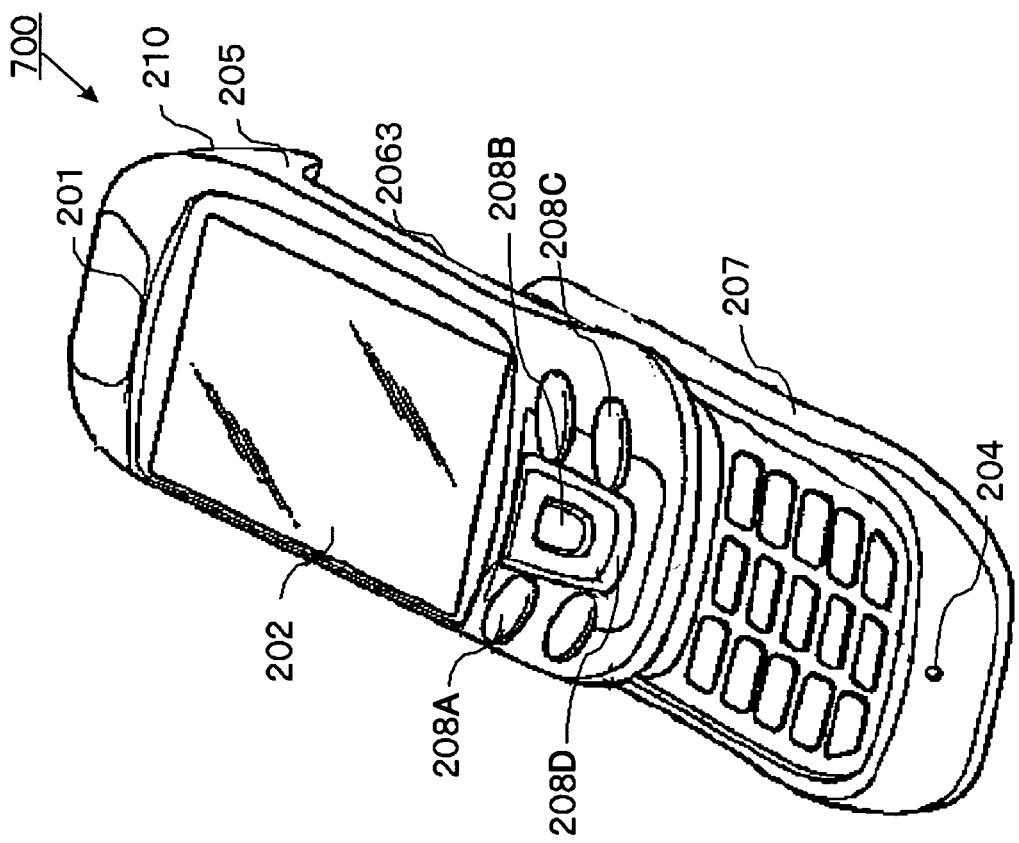

For example, FIGS. 13A and 13B illustrate a cellular phone 700 having a slide mechanism. FIG. 13A is a perspective view illustrating an opened state. FIG. 13B is a perspective view illustrating a closed state. The same structural parts as those of each embodiment will be denoted by the same reference numbers, and the explanations of which will be omitted.

In the cellular phone 700 having such a slide mechanism, when a slide unit 2063 slides and changes the state from the opened state of FIG. 13A to the closed state of FIG. 13B, or from the closed state of FIG. 13B to the opened state of FIG. 13A, a shock originating from sliding is possibly applied to the lens 304 and the piezoelectric element 306. The cellular phone 700 may be structured in such a manner as to set the lens position again by detecting the shock.

The invention changes the zoom magnification continuously in the foregoing embodiments, but can be applied to a case where the zoom magnification is changed stepwise like two steps, three steps, such as changeover between a normal mode (normal shooting mode) and a macro mode (closeup shooting mode).

The controller 108 may store the position of the lens 304 when becoming a mode of shooting an object by the camera.

For example, the waveform of the drive signal generated by the drive waveform generator 102 may not be rectangular, but may be sawtooth shape. The drive circuit 111 of the piezoelectric element 306 is constituted by the CMOS inverter circuit, but may be constituted by, for example, an H bridge circuit.

In the foregoing embodiments, the controller 108 acquires the position of the lens 304 based on the magnetic field intensity detected by the Hall element 308, and temporarily stores the lens position in the RAM. If a shock larger than the predetermined threshold is applied, the controller 108 so controls the lens 304 as to return to the position temporarily stored in the RAM. The controller 108, however, may perform control in such a way that the lens 304 is moved and returned to a predetermined return position. In this case, data representing the predetermined return position is stored in the ROM, a flash memory or the like. Specifically, the ROM or the flash memory stores the predetermined return position in association with a shoot mode, a zoom magnification, or the like. For example, a predetermined first return position is stored in association with the normal shooting mode, and a predetermined second return position is stored in association with the closeup shooting mode. As the shock detection circuit 110 detects a shock larger than the threshold, the controller 108 acquires the return position associated with the current shooting mode or zoom magnification from the ROM or the flash memory, and performs control in such a way that the lens 304 moves to the return position. This scheme is particularly effective in a case where the number of shooting modes that the user can set or a zoom magnification value is limited. This scheme can be realized by the controller 108 which runs a program storing data representing the return position in association with the shooting mode or zoom magnification.

A mobile communication terminal like a camera-mounted cellular phone is expected in each of the foregoing embodiments. The invention is, however, is not limited to this case, and can be applied to a generally-used electrical camera or a camera-mounted information processing device.

The program run by the controller 108 is stored in the ROM beforehand in each of the foregoing embodiments. The invention is, however, not limited to this case, and control like the foregoing control in the aforementioned embodiments can be executed by running a program for executing the aforementioned processes by an existing camera device. The scheme of providing such a program is arbitrary, for example, the program can be provided over a communication medium like the Internet, and can be stored in a recording medium like a memory card and distributed.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-213330 filed on Jul. 22, 2005 and Japanese Patent Application No. 2005-321005 filed on Nov. 4, 2005 and including specifications, claims, drawings and summaries of those applications. The disclosures of the aforementioned Japanese Patent Applications are incorporated herein by reference in their entirety.

What is claimed is:

1. An imaging device comprising:
    a lens;
    an image unit which images an object through said lens;
    an adjust unit comprising a piezoelectric element, the adjust unit configured for performing a first adjustment by deforming said piezoelectric element by applying a voltage thereto and thereby causing a distance between said lens and said image unit to be adjusted;
    a first detector which detects an electric signal generated by deformation of said piezoelectric element in response to a force external to the imaging device; and a controller which controls said adjust unit and causes the adjust unit to perform a second adjustment that causes said distance between said lens and said image unit to be readjusted when said electric signal resulting from deformation of the piezoelectric element caused by an external force is detected by said first detector;

wherein said controller controls said piezoelectric element so that detection by said first detector is switched off while said adjust unit is performing adjustment and that detection by said first detector is switched on while said adjust unit is not performing adjustment.

2. The imaging device according to claim 1, further comprising an acquisition unit which acquires a position of said lens, and wherein when a first position of said lens acquired by said acquisition unit at a time of adjustment by said adjust unit differs from a second position of said lens acquired by said acquisition unit at a time of detection by said first detector, said controller controls said adjust unit and causes the adjust unit to perform the second adjustment to return said lens to said first position.

3. The imaging device according to claim 2, further comprising a pair of detection members that are provided on a first hold member, which moves together with said lens and holds said lens, and a second hold member, which movably holds said first hold member, and that detect a distance between said first hold member and said second hold member by a magnetic field intensity, and wherein said acquisition unit acquires said position of said lens based on the distance between the first hold member and the second hold member detected by said detection members.

4. The imaging device according to claim 2, further comprising a memory unit which stores said first position, and wherein when said first position stored in said memory unit differs from said second position, said controller controls said adjust unit in such a way as to move said lens to said stored first position.

5. The imaging device according to claim 2, further comprising a receiving unit which receives an instruction input from a user to adjust the distance between the lens and the imaging unit to a predetermined position, and wherein when the receiving unit receives said instruction and said first position differs from said second position, said controller controls said adjust unit to move said lens to said first position.

6. The imaging device according to claim 5, wherein when said receiving unit receives the instruction, said controller ignores said first detector.

7. The imaging device according to claim 1, further comprising a first casing housing the imaging unit, a second casing opposite the first casing, a transformation mechanism which changes a positional relationship between said first casing and said second casing, and a second detector which detects that said positional relationship between said first casing and said second casing is changed by said transformation mechanism, and wherein when said second detector detects that said positional relationship between said first casing and said second casing is changed, said controller controls said adjust unit in such a way that said distance between said lens and said image unit is adjusted.

8. The imaging device according to claim 7, wherein said first casing and said second casing are connected with each other by said transformation mechanism having a rotation shaft, and said first casing rotates around said rotation shaft in such a manner as to overlap said second casing.

9. The imaging device according to claim 7, wherein said first casing and said second casing is connected with each other by said transformation mechanism which slides said first casing and said second casing each other, and said first casing slides in such a manner as to overlap said second casing.

10. A lens drive control method to be executed by an imaging device having a lens, an image unit, an adjust unit, a detector, and a controller, comprising:

an adjustment step in which said adjust unit performs a first adjustment of a distance between the lens and the image unit by deforming a piezoelectric element located between said lens and said image unit by applying a voltage to said piezoelectric element;

a detection step in which said detector detects an electric signal generated by deformation of said piezoelectric element in response to a force external to the imaging device; and a control step in which said controller controls said adjust unit and causes the adjust unit to perform a second adjustment that causes the distance between said lens and said image unit to be readjusted in accordance with said first adjustment when said electric signal is detected in said detection step;

wherein in said control step, said piezoelectric element is controlled so that detection in said detection step is switched off while adjustment is performed in said adjustment step and that detection in said detection step is switched on while adjustment is not performed in said adjustment step.

11. A computer-readable recording medium storing a program that allows a computer having a lens and an image unit to execute:

an adjustment step comprising performing a first adjustment of a distance between the lens and the image unit by deforming a piezoelectric element located between said lens and said image unit by applying a voltage to said piezoelectric element to thereby adjust the distance between said lens and said image unit;

a detection step comprising detecting an electric signal generated by a deformation of said piezoelectric element in response to a force external to the lens and the image unit; and a control step comprising controlling said adjustment step and causing the adjustment step to perform a second adjustment that causes said distance between said lens and said image unit to be readjusted in accordance with said first adjustment when said detection step detects said electric signal;

wherein in said control step, said piezoelectric element is controlled so that detection in said detection step is switched off while adjustment is performed in said adjustment step and that detection in said detection step is switched on while adjustment is not performed in said adjustment step.

12. An imaging device comprising:

a lens;

an image means configured for imaging an object through said lens;

an adjustment means comprising a piezoelectric element, the adjustment means configured for performing a first adjustment of a distance between the lens and the image means by deforming said piezoelectric element by applying a voltage thereto to cause the distance between said lens and said image means to be adjusted;

a detection means configured for detecting an electric signal generated by deformation of said piezoelectric element in response to a force external to the imaging device; and a control means configured for controlling said adjustment means and for causing the adjustment means to perform a second adjustment that readjusts said distance between said lens and said image unit in accordance with said first adjustment when said electric signal is detected by said detection means;

wherein said control means controls said piezoelectric element so that detection by said detector means is switched off while said adjustment means is performing adjustment and that detection by said detector means is switched on while said adjustment means is not performing adjustment.

* * * * *